Oct. 17, 1939.   G. C. HOLMES   2,176,737
MACHINE TOOL TRANSMISSION AND CONTROL
Original Filed March 11, 1937   10 Sheets-Sheet 1

INVENTOR.
Glenn C. Holmes
BY Fred G. Parsons
ATTORNEYS.

Fig. 4.

Oct. 17, 1939.   G. C. HOLMES   2,176,737
MACHINE TOOL TRANSMISSION AND CONTROL
Original Filed March 11, 1937   10 Sheets-Sheet 4

INVENTOR.
Glenn C Holmes
BY
Fred G Parsons
ATTORNEYS.

Oct. 17, 1939.   G. C. HOLMES   2,176,737
MACHINE TOOL TRANSMISSION AND CONTROL
Original Filed March 11, 1937   10 Sheets—Sheet 7

INVENTOR.
Glenn C Holmes
BY Fred G Parsons
ATTORNEYS.

Oct. 17, 1939.　　　　G. C. HOLMES　　　　2,176,737
MACHINE TOOL TRANSMISSION AND CONTROL
Original Filed March 11, 1937　　10 Sheets-Sheet 9

INVENTOR.
Glenn C. Holmes
BY Fred G. Parsons
ATTORNEYS.

Oct. 17, 1939.　　　G. C. HOLMES　　　2,176,737
MACHINE TOOL TRANSMISSION AND CONTROL
Original Filed March 11, 1937　　10 Sheets—Sheet 10

INVENTOR
Glenn C Holmes
BY
Fred G Parsons
ATTORNEY

Patented Oct. 17, 1939

2,176,737

UNITED STATES PATENT OFFICE 2,176,737

MACHINE TOOL TRANSMISSION AND CONTROL

Glenn C. Holmes, Madison, Wis., assignor to Gisholt Machine Company, Madison, Wis., a corporation of Wisconsin Application March 11, 1937, Serial No. 130,273
Renewed February 23, 1939

13 Claims. (Cl. 82—29)

This invention relates to transmission and control mechanism for machine tools, etc., and more particularly for the spindle transmission of a lathe.

A primary purpose of the invention is to provide an improved transmission clutch device and improved control mechanism therefor, and in a form particularly adapted for machine tool clutches and reversers.

A further purpose of the invention is to provide an improved mechanism, for a mechanical transmission having alternative driving or interrupting means, which will effect a period of less than full driving capacity of the driving-interrupting means during engagement thereof, as for instance to avoid shock upon starting or reversing a spindle transmission in a machine tool, or to assist the engagement of sliding gears or clutches of a spindle transmission.

A further purpose is to provide a clutch and operating mechanism therefor particularly adapted for an improved interlocking or interrelated operation of shifting devices for controlling transmission effects of various sorts, as for instance rate change, interruption, reversal and braking.

A further purpose is to provide an improved and simplified main clutch and reversing mechanism for use in combination with the transmission and control mechanism of the co-pending related applications, of Werner Irving Senger, Serial No. 58,549, filed January 10, 1936, and of Werner Irving Senger et al., Serial No. 83,306, filed June 3, 1936.

A further purpose is generally to simplify and improve the construction, operation and relationship of transmission and control mechanism of a machine tool, particularly when the transmission includes reverser or interrupter devices, and still other objects will be apparent from this specification.

The invention consists in the construction and arrangement of parts as herein illustrated, described and claimed, and in such modifications thereof as are equivalent to the structure claimed.

Throughout the specification the same reference characters have been used to indicate the same parts, and in the drawings.

Figure 1:
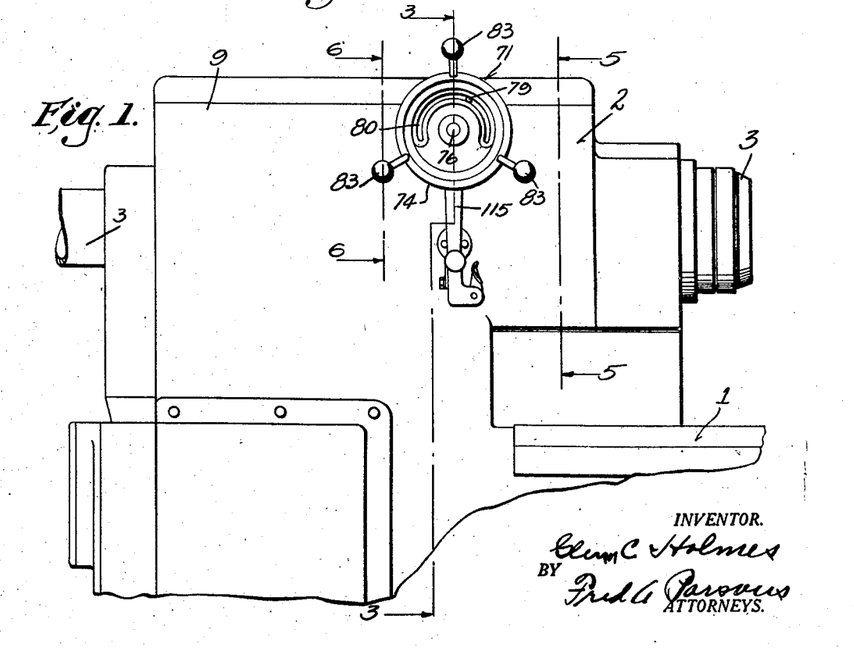
Figure 1 shows a front view of a headstock and spindle drive portion of a lathe in which the invention is incorporated.
Figure 2:
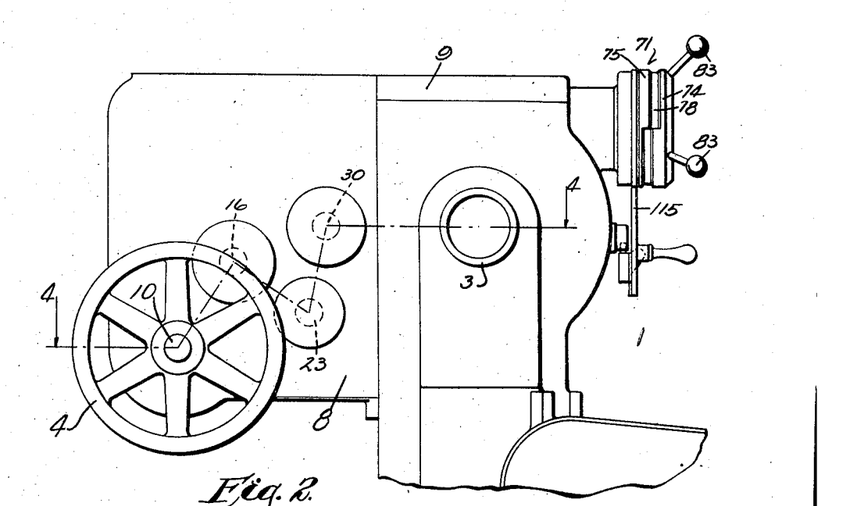
Figure 2 is a left end elevation of the same structure.
Figure 4:
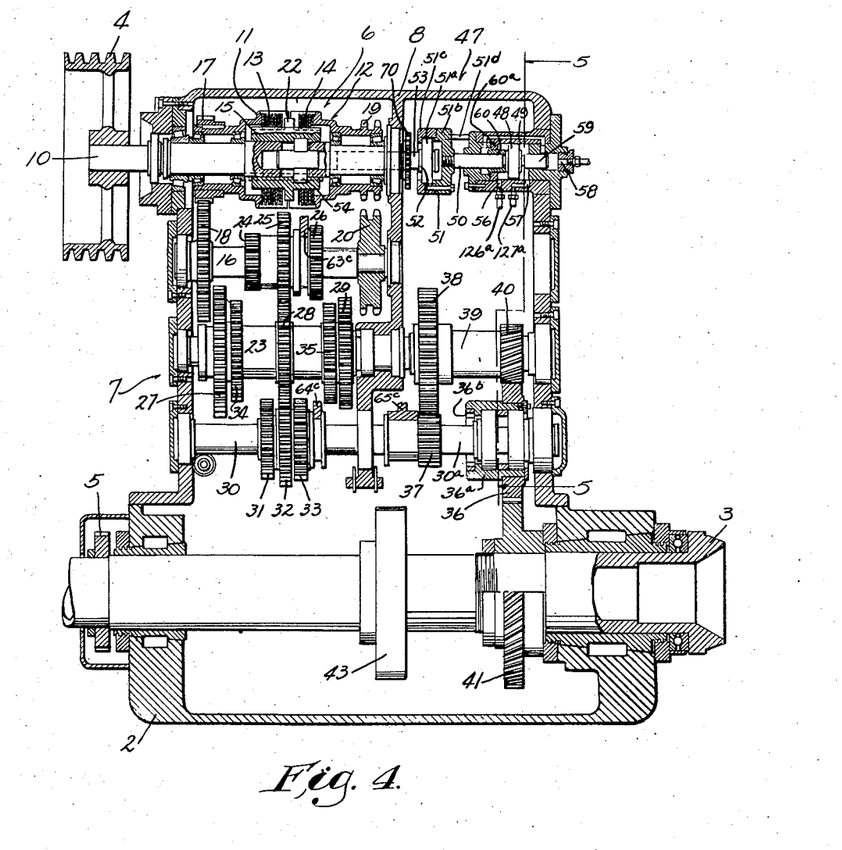
Figure 4 is a sectional development of the transmission for the spindle of the lathe shown in Fig. 1, taken approximately along the line 4—4 of Fig. 3, and also of Fig. 2.
Figure 5:
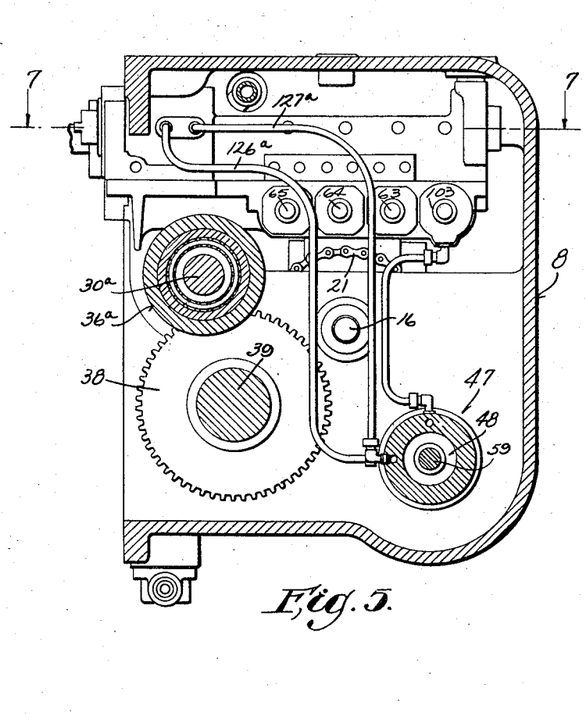
Figure 5 is an enlarged vertical section through a rear portion of the transmission and control, taken approximately along line 5—5 of Fig. 1 and more exactly along line 5, 5 of Fig. 4.

The machine of the drawings is a lathe, of the same construction as that shown in said co-pending application, Serial No. 83,306, which includes a bed, a portion of which is shown at 1, Fig. 1, upon which a headstock, generally denoted by the numeral 2, is mounted. A spindle 3, Figs. 1, 4, is driven from a power source associated with the machine, in this case a drive pulley 4. The lathe has suitable tool supports, not shown, driven through a feed train which may be any of several well known types driven from the spindle 3 through a feed gear such as 5, Fig. 4. Spindle transmission mechanism is provided for driving spindle 3 from pulley 4 at a variety of rotational speeds, the transmission being of improved form and arrangement as more particularly pointed out in a co-pending application of Werner Irving Senger, Serial No. 117,305, filed December 23, 1936. The spindle transmission includes the pulley 4, a reverser-interrupter generally denoted by the numeral 6, Fig. 4, and a rate change device generally denoted by the numeral 7, the pulley, reverser, rate changer and certain other mechanism being unitarily carried by a removable housing member 8, Figs. 2, 4, which is rigidly fixed with an upstanding housing portion 9 carried by bed 1, in which spindle 3 is rotatably mounted, as more particularly described in said copending application Serial No. 117,305.

The reverser-interrupter 6 is of the following construction: Pulley 4, Fig. 4, is fixed on a shaft 10, Figs. 4, 20, 21 which carries a plurality of outer clutch members 11, 12 each independently rotatable and respectively keyed with the alternate driven plates of different friction plate groups 13, 14 of different driving clutches each having alternate driving plates keyed to an inner member 15 which is slidably keyed on shaft 10. The member 11 drives a shaft 16 through meshed gears 17, 18. Member 12 drives shaft 16 through double sprockets 19, 20, the sprockets being connected by drive chains such as 21, Fig. 3. The inner member 15 provides an annular abutment portion 22, and is axially shiftable to alternatively cause frictional engagement between the plates of group 13, or oppositely to cause engagement of the plates of group 14; and the arrangement is such that as member 15 is shifted in opposite directions the shaft 16 is driven in forward and reverse directions.

The spindle rate changer 7 is constructed as follows: A shaft 23, Fig. 4, is driven from shaft 16 through a rate change device which includes the gears 24, 25, 26 fixed together and slidably keyed on shaft 16 and respectively engageable one at a time with gears 27, 28, 29 which are fixed on shaft 23. A shaft 30 is driven from shaft 23 through a rate change device which includes the gears 31, 32, 33 fixed together and slidably keyed on shaft 30 and respectively engageable one at a time with a gear 34, the gear 29 and another gear 35, each of the gears 34 and 35 being also fixed on shaft 23. A gear 36 is fixed on a sleeve 36a which is rotatably supported on the extended end 30a of shaft 30, sleeve 36a and gear 36 being driven from shaft 30 through a rate change device which includes a clutch gear 37 shiftable to engage internal clutch elements 36b on sleeve 36a, in which case gear 36 is driven at the same speed as the shaft 30, or to engage gear 38 of a reduction train consisting of gear 38, a shaft 39 co-axial with the shaft 23, and a gear 40 which meshes with gear 36, in which case gear 36 is driven at relatively slow speed. The gear 36 drives spindle 3 and feed gear 5 through a meshed gear 41 fixed on the spindle, and the several rate change devices and the reverser provide for eighteen changes of rotational spindle speed, substantially in a geometrical progression, and in either direction.

Figure 6:
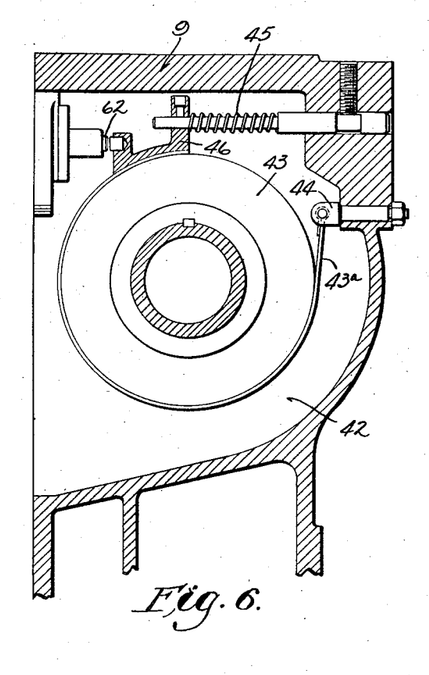
Figure 6 is an enlarged vertical section showing a spindle brake, taken approximately along line 6—6 of Fig. 1.

A spindle brake device generally denoted by the numeral 42, Fig. 6, includes a brake drum or friction wheel 43, Figs. 4, 6, a friction band 43a anchored at the one end with a stud 44 and normally urged toward released position by a spring 45 acting on an abutment member 46 which is fixed to the band.

Figure 15:
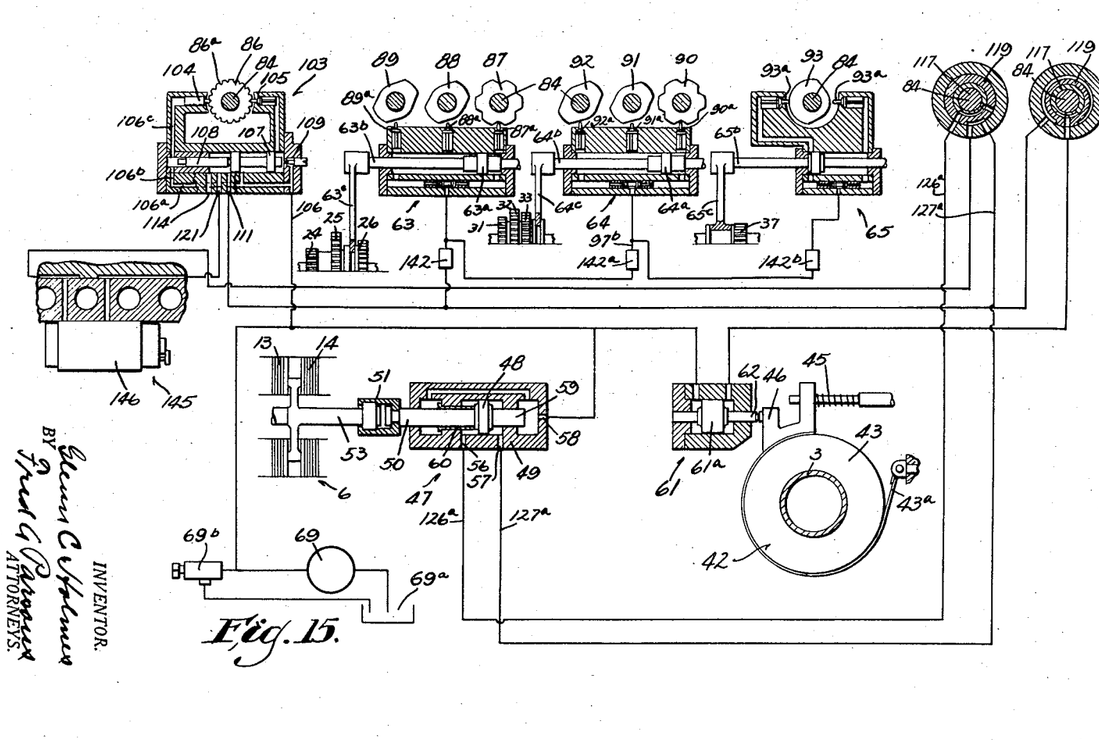
Figure 15 is a more or less diagrammatic view showing certain control mechanism of the machine and certain interconnections thereof.
Figures 20, 21:
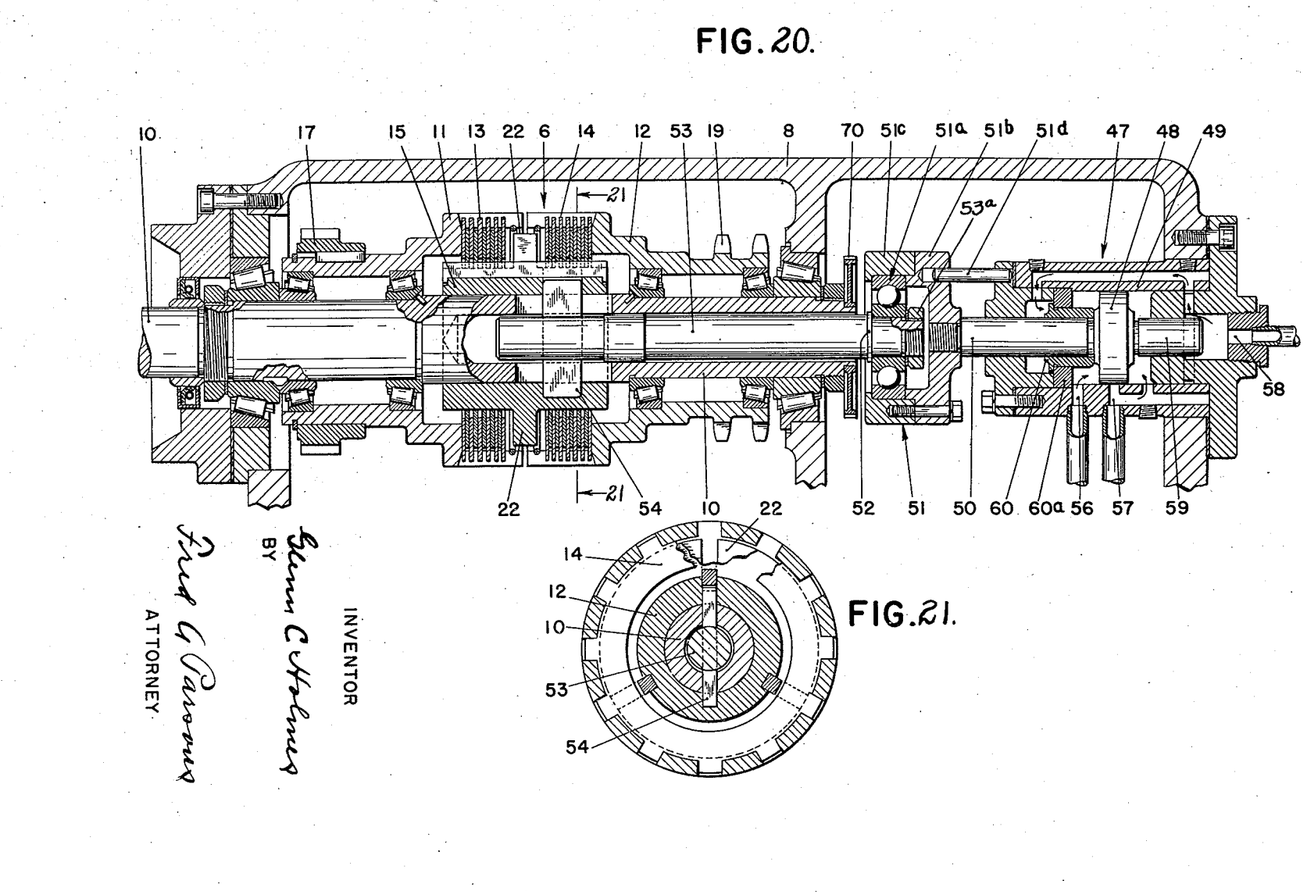
Figure 20 is an enlarged section, in somewhat greater detail, of the primary shaft of the transmission shown in Fig. 4, and mechanism associated therewith.
Figure 21 is a transverse section taken along line 21, 21 of Fig. 20.

The reverser 6, the various rate change units, and brake 42 are provided with means for this power operation including fluid operable piston devices as follows:

A reverser piston device for reverser 6, generally denoted by the numeral 47, Figs. 4, 15, 20, includes a fluid operable piston 48, a cylinder 49, and a piston rod 50 provided with a coupling unit 51 which couples the piston to the adjacent end 52 of a shifter rod 53 slidable in an axial bore of the shaft 10, and rotatable with the shaft, rod 53 being extended to carry a shifter member 54, Figs. 4, 20, 21 which extends radially outwardly through suitable slots in the shaft 10 to engage at its ends with the slidably keyed reverser clutch member 15, whereby, as piston 48 is shifted, the abutment portion 22 of the member 15 is correspondingly shifted to operate the reverser 6. The coupling unit 51 includes an anti-friction thrust bearing 51a having its inner race fixed on rod 53 as by a nut 53a and suitable thrust members 51b, 51c fixed on piston rod 50 and engaging the outer race, there being suitable means, as rod 51d preventing rotation of the thrust members and piston rod.

The piston 48 of reverser piston device 47 may be alternatively operated in the one or the other direction, whereby to engage the reverser 6 for forward or reverse rotation, by fluid pressure from suitable ports 56, 57, Fig. 4. Fluid pressure is continuously supplied to piston device 47 from a port 58 which continuously tends to shift reverser 6 to its central or non-engaged position, the pressure from port 58 acting at the one end of the device against an extended portion 59 of piston rod 50, and at the other end of the device against a shouldered sleeve 60. Whenever fluid pressure is applied through either port 56, 57 the piston 48 and rod 50 are shifted against the resistance of the fluid pressure from port 58 by reason of the relatively large area of piston 48, but when pressure is released from both ports 56, 57 the piston device 47 and reverser 6 will immediately be shifted to central non-driving position, the fluid from port 58 then simultaneously forcing the sleeve 60 to the right against a shouldered portion 60a, and forcing the piston rod to the left until the piston rests against the end of sleeve 60.

Figure 7:
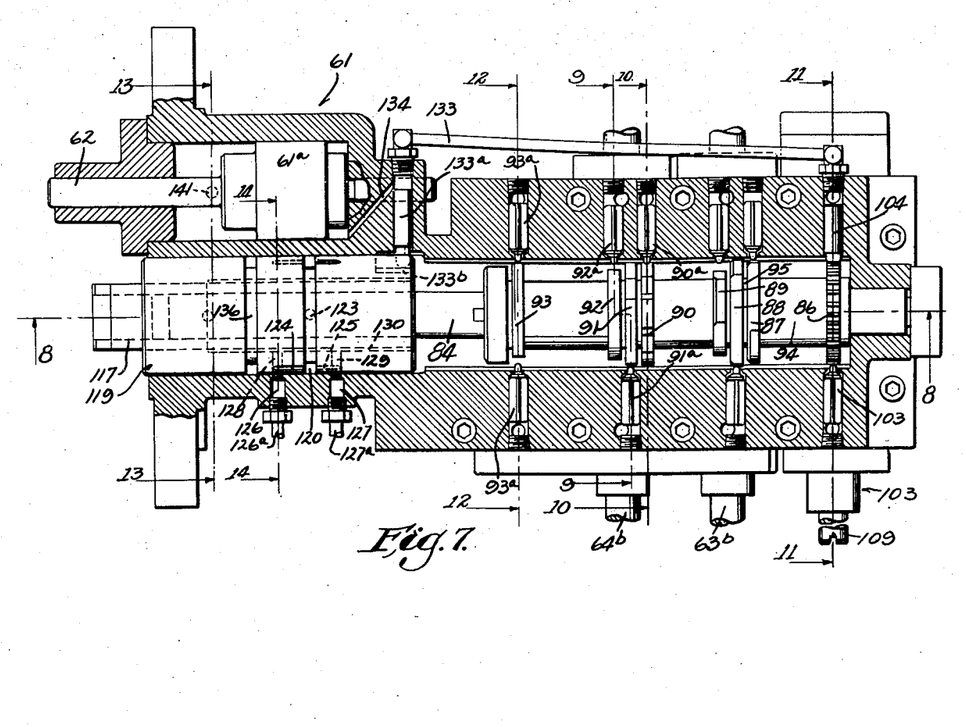
Figure 7 is an enlarged horizontal section of a controller unit taken approximately along line 7—7 of Fig. 5.

A spindle brake piston device, generally denoted by the numeral 61, Figs. 7, 15, includes a piston 61a, having a rod 62, Figs. 6, 7. Piston 61a may be forced to the left in Fig. 7, as will be later explained, to overcome spring 45 and engage brake 42, or may be forced in the other direction to permit spring 45 to release the brake.

Figures 8, 9, 10:
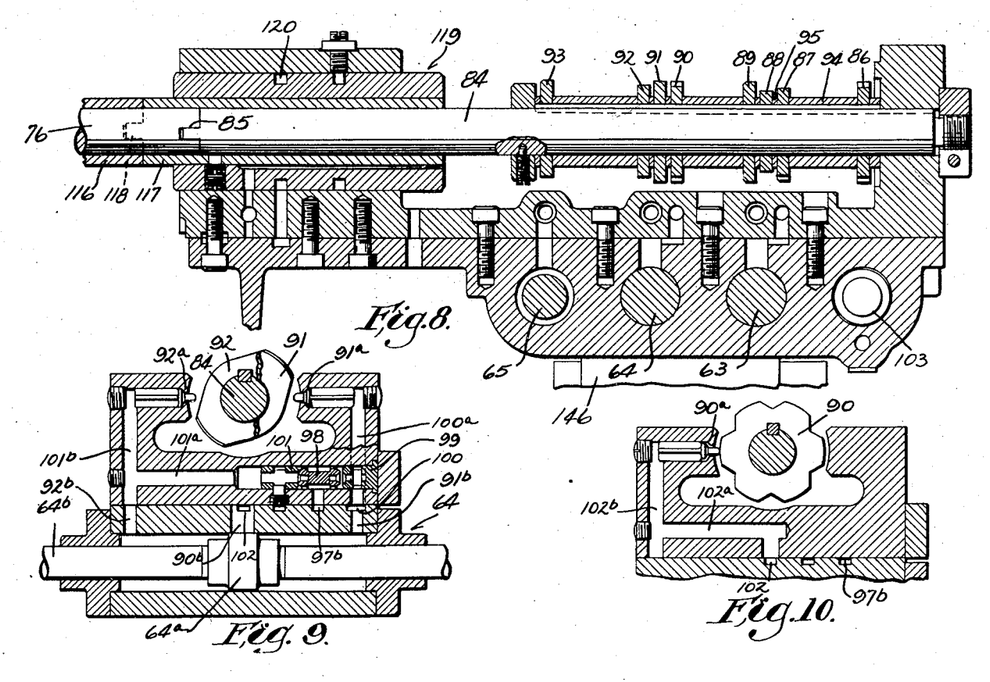
Figure 8 is a vertical section of the same controller unit and associated structure, taken approximately along line 8—8 of Fig. 7.
Figures 9, 10, 11, 12, 13, 14 are vertical sections of the same controller unit, taken respectively along lines 9—9, 10—10, 11—11, 12—12, 13—13 and 14—14 of Fig. 7.

For the speed change device comprising the shiftable gears 24, 25, 26, Figs. 4, 15, there is provided a shifter including a piston device generally denoted by the numeral 63, Figs. 8, 15, which includes a piston 63a, upon the piston rod 63b of which is fixed a shifter arm 63c engaging a suitable annular groove in the gear unit.

For the speed change device comprising the shiftable gears 31, 32, 33, Figs. 4, 15, there is provided a shifter including a piston device generally denoted by the numeral 64, Figs. 8, 9, 15, which includes a piston 64a, upon the piston rod 64b of which is fixed a shifter arm 64c engaging a suitable annular groove in the gear unit.

Figure 12:
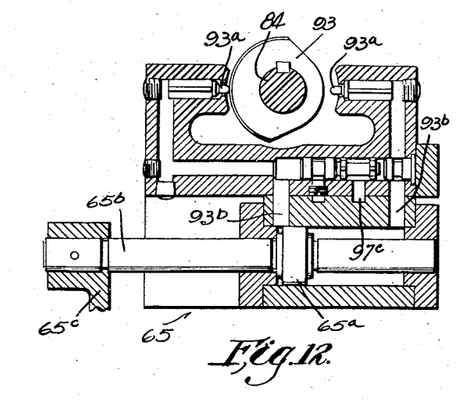

For the speed change device comprising the shiftable clutch gear 37, Figs. 4, 15, there is provided a shifter including a piston device generally denoted by the numeral 65, Figs. 8, 12, 15, which includes a piston 65a upon the piston rod 65b of which is fixed shifter arm 65c engaging a suitable annular groove in the hub of the gear.

For the operation of the several piston devices a pressure fluid source, such as a pump of any suitable type, as indicated at 69, Fig. 15, is driven whenever pulley 4 is running, as for instance by a gear 70, Fig. 4, fixed on shaft 10, the pump drawing oil from a sump 69a, diagrammatically shown in Fig. 15 which may, for instance, be formed by the lower portion of the spindle gear housing. Excess oil and waste from operation of the shifters is used to lubricate the transmission. The pressure of the fluid for the several piston devices is maintained constant by providing pump 69 with excess capacity, and by providing a constant pressure relief valve 69b, Fig. 15, as of suitable type. Excess fluid from valve 69b may be distributed through lubricating channels (not shown) and returned to the sump.

Figure 3:
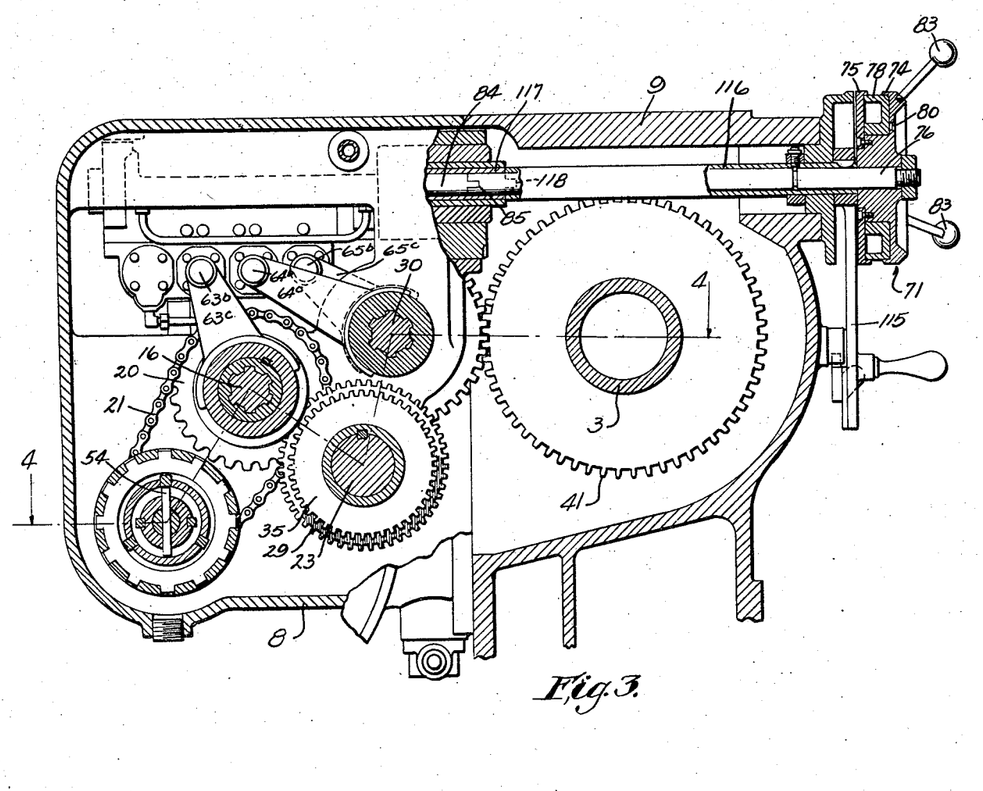
Figure 3 is a vertical section, taken approximately along the line 3—3 of Fig. 1 and enlarged.
Figure 16:
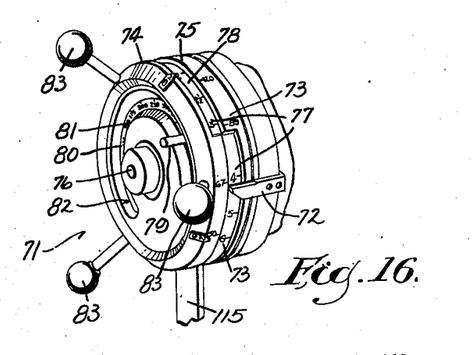
Figure 16 is a perspective view of a speed change controller.

Control means for the operation of the various piston devices is provided as follows:

A speed selector device, generally indicated by the numeral 71, Figs. 3, 16 is similar to that shown in said copending application, Serial No. 58,549, which will therefore be here only briefly described. The selector device includes a fixed indicator pointer 72 against which a plurality of charts or scales are readable. One of the charts includes numerals such as 73 arranged on the exposed peripheries of flange members 74, 75 which are both fixed for rotation with a shaft 76. The numerals 73 are arranged in consecutive order and correspond with the rotative speeds available for spindle 3 upon operation of the several rate change devices to their various position combinations. Another chart readable against indicator 72 includes numerals such as 77 arranged on the periphery of an annular member 78 which is frictionally held to be normally rotatable with the flange members 74, 75, but is adjustable relative thereto by the means of a handle 79 which projects through a slot 80 in the member 75. The numerals 77 indicate different work diameters within the speed range of the machine and arranged in consecutive order.

Still another chart includes numerals such as 81, arranged in consecutive order on the face of the member 78 to be visible through slot 80 and readable against an indicator pointer or arrow 82 which is rotatable with shaft 76. The numerals of the last mentioned chart are arranged to indicate surface or peripheral speed on the work piece rotating with the spindle.

As illustrative of the use of the speed selector device there is selected on the chart 81 a desired peripheral speed suitable for the turning tool used and for the work material to be operated upon, the member 78 being turned by lever 79 until that peripheral speed is indicated against the pointer 82. Shaft 76 is then turned in either direction by the means of handles such as 83 until the diameter of the work piece as listed on the chart 77 is indicated against the pointer 72. If this does not exactly correspond to an available rotational speed, as indicated on chart 73 then choice must be made of a slightly higher or lower rotational speed, the rotative speed thus selected being aligned with pointer 72, whereupon the shifter devices, later described, will shift the rate change devices to effect the desired speed.

The positioning of the selector device, as described effects the selected speed by the means of mechanism as follows:

Shaft 76, Fig. 3, is coupled for rotation with a coaxial shaft 84, Figs. 7, 8 by the means of an axially disengageable tongue and slot coupling indicated at 85, Fig. 8. Fixed on shaft 84 are a plurality of cam members 86, 87, 88, 89, 90, 91, 92, 93, Figs. 8, 15 separated by spacers such as 94, 95, to operate various poppet valves which control the shifting of the piston devices to effect rate changing.

Thus, for controlling the movement of the piston device 63 the cams 87, 88, 89, Figs. 8, 15 respectively operate the poppet valves 87a, 88a, 89a. For piston device 64 the cams 90, 91, 92 operate poppet valves 90a, 91a, 92a and for piston device 65 the cam 93 operates both the poppet valves 93a, 93a. In each instance the configuration of the cams is such that as shaft 84 is rotated one only of the poppet valves of each piston device is opened by the cams in each angular position of the shaft 84 corresponding to the points where the different rotative speed indicating chart numerals 73 read against the indicator pointer 72. In each such positions the cams are cut away to permit the fluid pressure to close the other valves of the set against their seats. It will be understood that in the drawings the cams are more or less diagrammatically shown, but it will be obvious that in each device the cams may be formed to operate as just described.

The different poppet valves of the piston devices 63, 64, 65 each communicate with a different port of the associated piston device, the ports being spaced in the direction of piston movement according to the different piston positions required. Opening the poppet valve results in movement of the piston of the device to a position corresponding to the port leading to the open valve, whereby to shift the speed change units to the indicated speed position. As illustrative of this action the operation of the piston device 64 is as follows:

Referring to Figs. 9, 10, the piston device 64 has ports 90b, 91b, 92b respectively controlled by poppet valves 90a, 91a, 92a through suitable channels. In each instance opening the poppet valve will provide a fluid drain for the port. The ports are spaced in accordance with the three positions required for the piston 64a. Fluid is supplied to the piston device through a channel groove 97b and a valve member 98 which may move axially in either direction. In the one direction of movement valve 98 seats against a member 99 to prevent flow of fluid from channel 97b to a groove 100 which communicates directly with port 91b, and with the poppet valve 91a through a channel 100a. In the other direction of movement valve 98 seats against a member 101 to prevent flow of fluid to the port 92b and to poppet valve 92a through the channels 101a, 101b. Thus if either poppet valve 91a or 92a is opened the resulting reduction of pressure moves valve 98 in the direction of the opened poppet valve, and holds it in position closing the flow of fluid from supply channel 97b to the open valve. This leaves the one end of piston 64a connected to the pressure supply, and the other connected to the open poppet valve. The piston will therefore move in the direction of the open valve, thereby shifting the associated gear unit. Port 90b communicates with poppet valve 90a through a groove 102, Figs. 9, 10, and channels 102a, 102b, and, similarly to the operation just described, the opening of poppet valve 90a when piston 64a is in either extreme position, relieves the pressure on one end of the piston, whereupon the pressure on the other end moves the piston until the piston covers the port 90b leading to the open poppet valve.

The spacing of the ports 90b, 91b, 92b is such that, accordingly as the one or the other of the poppet valves is opened the piston 64a will move to three positions, corresponding to the three speed productive positions of the gears 31, 32, 33, accordingly as the cams 90, 91, 92 open the one or the other of the poppet valves 90a, 91a, 92a.

The piston device 63 is constructed similarly to the device 64, just described and is similarly moved to three positions, corresponding to the three positions of gears 24, 25, 26, accordingly as cams 87, 88, 89 open poppet valves 87a, 88a, 89a. Since the connection and operation is substantially the same as the device 64 it will not be described in detail.

The piston device 65, Figs. 12, 15 is also similarly controlled for movement to the two positions of the clutch gear 37 by the means of fluid supplied from a channel 97c, accordingly as cam 93 opens the one or the other poppet valve 93a, 93a, but in this instance, the piston 65a having only two positions, only two ports are required, as shown at 93b, 93b, Figs. 12, 15.

The various poppet valve cams associated with piston devices 63, 64, 65 are so configurated and positioned that as shaft 84 is rotated the various piston devices and speed change elements are moved to different position combinations resulting in speeds arranged in numerical order, and at points in the rotation of the shaft corresponding to the position of the rotation chart numerals 77 as they are successively readable against indicator 72. This results also in the arrangement of the numerals of the other charts in numerical order, the spacing thereof being determined by the spacing of the numerals on the rotation chart.

Figure 11:
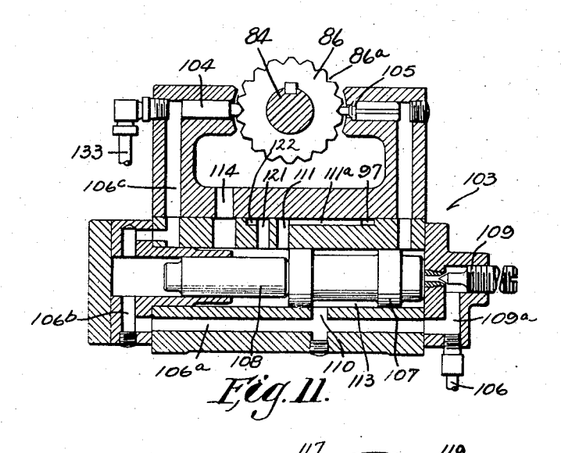

Means are provided to prevent the shifters from starting to move as the selector shaft 84 is rotated to pass through one or more positions corresponding to undesired speeds. To effect this result and other results later mentioned there is provided a delay device, generally denoted by the numeral 103, Figs. 11, 15. The cam 86, Figs. 8, 11, 15 is provided with notches such as 86a, corresponding in number and position to the speed positions of selector shaft 84. The notches 86a are normally engaged by a fluid pressed detent plunger 104, yieldably holding the cam and shaft in the various speed positions, both to mark the speed position for the operator, and to locate the cam relative to a poppet valve 105, the plunger 104 being continuously supplied with fluid from source 69, as by a pipe channel 106, and communicating channels 106a, 106b, 106c.

The delay device 103 includes a piston plunger 107 and a piston plunger 108 of relatively smaller area. The left end, Fig. 11, of piston 108 is continuously supplied with fluid through the channels 106, 106a. The right end of piston 107, Fig. 11, is supplied with fluid from channel 106 through an adjustable needle valve device 109 and a channel 109a. The pressure acting on the right hand end of piston 107 normally forces both pistons 107 and 108 to the left in Fig. 11, to a position where a port 110, which is continuously supplied from channel 106a, communicates with an outlet port 111, through an annular groove 113 in piston 107. The port 111 is connected to a channel 97 through a groove 111a to supply fluid to the shifter devices 63, 64, 65 as later described, but when the poppet valve 105 is opened by cam 86 during rotation of selector shaft 84 to effect a change in speed, the fluid pressure on piston 107 is immediately relieved and piston 108 forces piston 107 to the right, to the position shown in Fig. 11, and in this position the supply port 110 is cut off from port 111, and port 111 and channel 97 are connected to a drain channel 114. Piston 107 will almost immediately again move to the left to close the drain and again supply fluid to port 111 and channel 97, but only after needle valve 109 has permitted sufficient fluid to move the piston to flow therethrough. The interval of delay may be varied by adjustment of the needle valve 109, but is sufficient that in rotating shaft 84 at normal adjustment speed no pressure will be available in channel 97 for operation of the piston devices 63, 64, 65 until the selector shaft comes to rest in a desired speed position.

Figure 14:
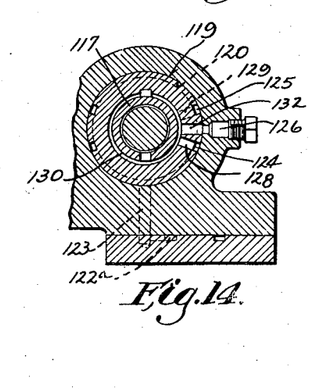

The reverser piston device 47, Figs. 4, 5, 15, 20 may be controlled to shift reverser 6 into the one or the other direction position by the means of a hand lever 115, Figs. 3, 16, fixed on a sleeve 116, Figs. 3, 8, which is co-axial with shafts 76, 84 and coupled with a co-axial sleeve 117, Fig. 8, by the means of a tongue and slot coupling connection 118. Fixed on sleeve 117 is a rotary valve member 119, Figs. 7, 8 having an annular fluid channel 120, Figs. 8, 14, which is supplied with fluid from the delay device 103, Fig. 11, through an outlet port 121, a channel groove 122, Fig. 11, a channel groove 122a, Fig. 14, and channel 123, Figs. 7, 14. From the annular groove 120 short channel grooves 124, 125, Figs. 7, 14 extend respectively in opposite axial directions to effect communication between the groove 120 and the different ports 126, 127, Fig. 7, respectively as the lever 115 is moved in opposite directions. The ports 126, 127 respectively communicate through pipe channels 126a, 127a, Figs. 5, 7 with the ports 57, 56, Figs. 4, 20, of reverser piston device 47. Simultaneously with movement of lever 115 to bring either port 126, 127, Fig. 7, into communication with the supply channel, the other port is connected to a drain, there being drilled holes 128, 129, Figs. 7, 14, suitably spaced for the purpose and communicating with an interior chamber or annular groove 130 which is extended to the end of the sleeve valve 119 to drain into the interior of the headstock. When hand lever 115 is in central position both the ports 126, 127 are connected to the drain groove 130, there being a plurality of drilled channels such as the channel 132, Fig. 14, for port 126, suitably positioned in the valve sleeve 119 to effect such connection, a similar channel being provided for the port 127.

By reason of the construction of the sleeve valve 119 and the construction of the reverser piston device 47, previously described, it will be apparent that the movement of lever 115 in either direction effects corresponding engagement of the reverser 6, while a central position of the lever 115 effects an intermediate disengaged position of the reverser.

Means are provided to control the reverser 6 from the speed selector device, and which are effective to shift the reverser to a position interrupting the transmission to spindle 3 each time a speed change is effected, and to return the reverser to its previous position, as determined by lever 115, upon completion of the speed change. As previously stated the supply of fluid to effect movement of the reverser is through the port 121, Fig. 11, of delay device 103. Port 121 normally receives fluid from supply port 110, but in the operation of the device during speed change as previously described port 121, as well as port 111, is cut off from supply port 110 and connected to the drain port 114. The result is to connect either active port 56 or 57 of reverser piston device 47, Figs. 4, 20 to the drain, and since the port 58 of the reverser piston device is continuously supplied with fluid, the reverser 6 will be immediately shifted to disengaged position, as previously described, where it will remain until the needle valve 109 has permitted sufficient fluid to pass to again shift piston 107, Fig. 11, to normal position connecting ports 110 and 114. Following this the reverser piston device will again be supplied with pressure fluid to shift reverser 6 to whatever position it previously occupied, unless the connection controlled by lever 115 has been changed during the speed change operation.

Figure 13:
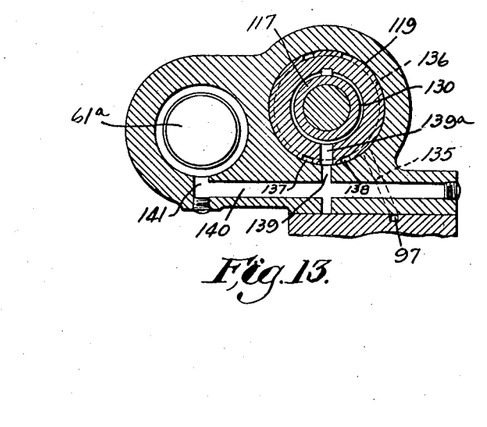

The brake 42, Figs. 6, 15, is controlled to be operative from the speed selector device during speed change and to be forced to braking position whenever lever 115 is in the position disengaging reverser clutch 6, as follows: Fluid pressure is continuously supplied to the brake piston 61a, Fig. 7, in a direction to urge the brake to braking position, the fluid supply being derived from pump 69 through port 106, Fig. 11, through the channels 106a, 106b, 106c, pipe connection 133, Figs. 7, 11, and a drilled channel 134, Fig. 7. The braking pressure thus applied may be overcome, whereby to release the brake, by the combined pressure of spring 45, Figs. 6, 15, and fluid pressure applied to the other side of piston 61a, at the left end, Fig. 7. Fluid for the latter purpose is supplied from port 111 of the delay device 103, Fig. 11, through the channel 97, Figs. 11, 13, a channel 135, an annular channel 136 in valve sleeve 119, Figs. 7, 13, and the one or the other of the channel grooves 137, 138, respectively positioned in the valve sleeve 119 for communicaiton with a channel 139 in the different clutch engaged positions of lever 115 and sleeve 119. From channel 139 the pressure fluid reaches piston 61a through channels 140, 141. In the disengaged or central position of reverser control lever 115 the valve sleeve 119 is in position, as shown in Fig. 13, to close the channel 139 against both the supply channels 137, 138, and to open the channel 139 to the drain 130 through a channel 139a in valve sleeve 119 whereby to cause engagement of the brake. Thus, whenever the reverser 6 is engaged in either direction position the brake 42 is normally disengaged, but upon shifting of the reverser to disengaged position brake 42 engages. Also, since the supply of brake disengaging fluid is through the port 111 of delay device 103, it will result that in each operation of speed changing the brake release supply will be connected to drain port 114, Fig. 11, and the brake will then be engaged temporarily irrespective of the position of the reverser control devices, substantially simultaneously with disengagement of the reverser as previously described. But, as later explained, the brake is disengaged again before the reverser is re-engaged. A fluid operated detent member 133a, Fig. 7, is continuously pressed by fluid from the pipe channel 133 to engage suitable notches such as 133b in the sleeve valve 119, whereby to define the three positions of the sleeve valve.

By reason of the relative positions of the port 111, Fig. 11, which supplies pressure fluid to the shifter devices 63, 64, 65 and also for releasing brake 42, and port 121, which supplies fluid to engage reverser 6, the port 121 is opened to the drain 114, during right hand movement of piston 107, before the port 111. Therefore, during any speed change operation the reverser 6 is disengaged somewhat before the brake 42 is engaged.

Figure 17:
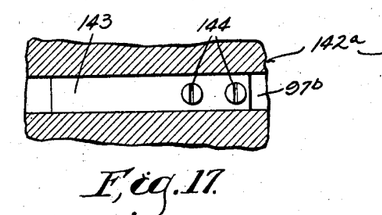
Figures 17, 18 are partial sections showing respectively top and side views of a pressure delay device associated with the rate change piston devices.
Figure 18:
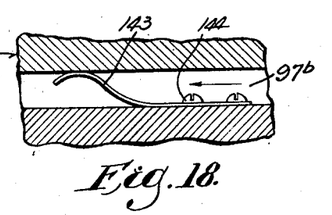

Following connection of port 111, Fig. 11, to the drain 114 during the right hand shifting of piston 107 the brake 42 is immediately engaged, thereby stopping rotation of spindle 3. Following operation of needle valve 109 to again connect port 111 to the supply port 110 the brake 42 is released immediately and before the operation of any of the piston devices 63, 64, 65, there being restricting means operative on each of the piston devices but not on brake releasing means, as follows: Referring to Fig. 15 it will be seen that the fluid pressure from port 111 of the delay device 103 reaches the shifter piston devices 63, 64, 65 only through devices 142, 142a, 142b. These devices are serially arranged for the piston device 63 to receive fluid only through device 142, while piston device 64 receives fluid through both devices 142, 142a, and piston device 65 receives fluid through all three devices 142, 142a, 142b. The several devices 142, 142a, 142b are similar in construction and operation and therefore only the device 142a is shown in detail. Referring to Figs. 17, 18 the device includes a spring member 143 which is fixed by means of screws such as 144 in the channel or supply groove 97b through which fluid reaches the piston devices 64 and 65, the edges of the spring being closely but movably fitted to the sides of the channel groove, and the spring being of such form as to close the channel except as it is sprung by the pressure of the fluid. The springs of each device 142, 142a, 142b are of material resistance, as for instance 15 or 20 pounds. As will be seen from Fig. 15, the devices 63, 64, 65 will therefore operate in sequence as the pressure from delay device 103 rises; the device 63 operating when the fluid overcomes the first device 142, the device 64 operating when the pressure is twice as high whereby to overcome both the device 142 and 142a, and device 65 operating only when the pressure is sufficient to overcome the three devices 142, 142a, 142b. Since brake 42 receives its pressure for brake release from port 111, Fig. 11, exclusive of devices 142, 142a, 142b, as shown in Fig. 15, the brake will be released during any rate change prior to the operation of either piston device 63, 64, 65.

The fluid for the supply of the reverser piston device 47 is derived through the channel 121 of the delay device 103, Fig. 11, as previously explained. The relative positions of ports 111 and 121 is such that, following a rate change operation, the left hand movement of piston 107 will connect port 111 to the supply port 110 prior to the connection of port 121 for re-engagement of the reverser 6. Brake 42 will, therefore be released prior to the re-engagement of reverser 6.

Figure 19:
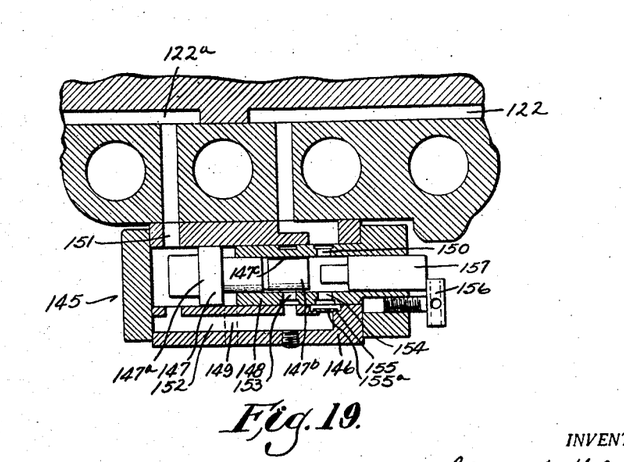
Figure 19 is a vertical section of a control device associated with the spindle reverser.

To further control the reverser engagement, an engagement control device is provided, generally denoted by the numeral 145, Figs. 15, 19. This device is connected serially in the line leading to the reverser piston device 47 from channel 121 of the delay device 103, as indicated in Fig. 15, and therefore controls the operation of the reverser under all conditions whether operated from lever 115 or from the rate selector since, as previously explained, all the fluid for shifting the reverser is derived from the port 121.

Device 145 includes a cylinder member 146, Figs. 8, 15, 19, fixed on the bottom of the housing member for the piston devices 63, 64, 65 and adjacent to the delay device 103. A piston 147, Fig. 19, provides an enlarged portion 147a and a relatively smaller portion 147b, the latter operating in a sleeve 148 fixed in the cylinder bore. The intermediate portion of the piston 147 is exposed to a drain port 149. The smaller area 147b is exposed to the pressure derived from the port 121 and channel 122, Fig. 11 of delay device 103, through a port 150. The larger area 147a is exposed through a port 151 and the channel 122a, Figs. 14, 19 to the pressure in the channel 123, Fig. 14 which supplies the reverser piston device 47 through the rotary control valve 119. A passage 152, Fig. 19, continuously communicates with the port 151 and channel 122a at the one end, and at the other end provides a port 153 which is alternatively covered or uncovered by the small piston end 147b as piston 147 moves to right or left respectively, but even when the piston 147 is to the right some communication exists between the channels 122 and 122a, the small piston end 147b being of slightly reduced diameter at 147c to provide a leakage path past the piston. A port 154 continuously communicates with channel 122 through port 150, and also with channel 122a through port 151, but is prevented from passing fluid from port 150 to port 151 by a one-way valve device 155, which may be of any suitable well known type, in this instance including a flat spring 155a which closes the channel in the direction mentioned but yields to permit substantially free flow of fluid from port 151 to 150.

By reason of the construction of device 145 as just described the reverser piston device 47 will operate to immediately disengage the reverser, as previously described, as a first step in the operation of rate change, the clutch engaging pressure being drained from the supply channel 122a through the one-way valve 155, Fig. 19, port 150, channel 122, and port 121 and drain port 114 of delay device 103, Fig. 11.

The piston 147 of control device 145 normally stands to the right in Fig. 19, being forced to this position by the relatively large area exposed at the left piston end. When the fluid is drained from channels 122, 122a, during rate change, the piston 147 temporarily remains to the right. But as fluid pressure is restored to channel 122, following a rate change, the piston 107 immediately moves to the left, because there is then no pressure on the larger left end. Such initial movement of the piston builds up an initial pressure in the port 151 and channel 122a, but the initial pressure is less than the pressure in channel 122 in the same proportion as the area of end 147b is less than the area of end 147a. The initial pressure for operation of reverser piston device 47 and the reverser 6 is therefore relatively low. The pressure in channel 122a is, however, gradually increased, by leakage through the restricted passage provided by the reduced piston diameter at 147c, until it becomes equal to the pressure in channel 122 and the reverser clutch plates are then exposed to the full operating pressure.

At some intermediate point in the increase of pressure just described, where the pressure on the larger end 147a of piston 147, Fig. 19, over-balances the pressure on the smaller end 147b, the piston 147 again moves to the right to take up its normal operating position. This right hand movement also operates to slow down the equalization of pressures in channels 122, 122a because the right hand movement increases the length of the restricted passageway at 147c and therefore reduces the rate of flow of the pressure equalizing fluid.

For regulation of the period required to build up the pressure in channel 122a, Fig. 19, there is provided a screw 156 which is adjustable to control the position of an abutment piston 157. The piston 157 is forced against screw 156 by fluid pressure, and provides an abutment determining the extent of the right hand movement of piston 147. The farther piston 147 stands to the right, Fig. 19, following movement to the right during the equalization of pressure between passages 122, 122a, the longer the equalizing operation will require.

By reason of the construction described the device 145 has no effect upon the disengagement of the reverser 6, but during engagement of either reverser clutch 13, 14 after interruption the device operates to start the transmission under initially reduced and gradually increasing pressure, thus starting the gears slowly under partial power to assist engagement thereof during a rate change operation and, in any engagement or reversal, operating to avoid shock by gradually overcoming the inertia of the driven train.

The sequence of operations involved in a rate change operation is as follows: Assuming that the lever 115, Fig. 16, is in a position to engage reverser 6, and that the desired new spindle speed is for the same direction of spindle rotation. In such case the only manual operation required is to rotate the selector in either direction by manipulation of the handles 83 of selector 71 until the desired new spindle speed, as listed on chart 73, is in registry with the indicator 72. During such rotation the poppet valve 105 of the delay device 103, Fig. 11, will be opened each time the cam 86 passes through a position intermediate the notches 86a, and as soon as the poppet valve is first opened the piston 107 starts to move to the right, Fig. 11, thereby connecting port 121 to drain 114 whereby to effect a shift of reverser piston device 47 and reverser 6 to intermediate motion interrupting position. Slightly later in the right hand movement of piston 107 of device 103 the port 111 is also opened to the drain 114, thereby immediately effecting a braking position of brake 42 to stop spindle 3. Upon the selector chart arriving at the desired speed position the poppet valve 105 of device 103 remains closed and fluid flows through needle valve 109, Fig. 11, to shift piston 107 to its normal left hand position. During such left hand shift it first occurs that port 111 is opened to pressure fluid, whereupon the spindle brake 42 is immediately released, and as the pressure rises in port 111 the rate change shifter piston devices 63, 64, 65 are subjected to pressure in the order mentioned, the sequence being controlled by the devices 142, 142a, 142b.

The new speed position of the selector device 71 effects a new position combination of the poppet valve cams and poppet valves associated with the piston devices 63, 64, 65, and therefore the rise of pressure in these devices will urge the pistons to effect a corresponding new position combination, but only those pistons will be moved where a poppet valve closed in the previous speed position has been opened in the new speed position.

Very shortly after pressure fluid has been admitted to the port 111, Fig. 11, the continued movement of piston 107 to the left also opens port 121 to pressure fluid, which is applied to the reverser piston device 47 through the control device 145 and the direction control valve 119 to effect engagement of the reverser 6. Since the direction control valve 119 has not been moved during the rate change operation the result is to engage reverser 6 to effect the same spindle direction as before the rate change, but by reason of the operation of the device 145 to initially restrict the fluid pressure to relatively low value, as previously explained, the reverser engagement is without jar or shock.

Following the release of brake 42 in the operation described above the spindle train if free to turn, the slight friction of the disengaged reverser clutch plates will ordinarily turn the train slowly to assist engagement of the various gears to be shifted during a rate change, but in any event the gears will start to turn as soon as the reverser starts to engage, and during the interval while device 145 is effecting the building up of the reverser pressure the gears will rotate slowly to insure meshing of the engaging gears.

The construction and control of the reverser-interrupter 6 is such that the device acts as an overload or power limiting device for the machine. To effect this result the friction plate groups 13, 14, Fig. 20, of the different driving clutches are of such friction area and diameter, relative to the effective diameter of piston 48 of the piston device 47, and to the fluid pressure per unit of piston area, as determined by the relief valve 69b, Fig. 15, that when an excess of resistance to the operation of the transmission is encountered the friction plates will slip, while carrying proper loads without slip, except such as is required for the improved operation of the rate change devices, and to overcome inertia shock during reversal, as has been previously mentioned.

It is to be noted however, that the fluid pressure per unit of area is, in part, controlled by the requirements of other control mechanism. The serially arranged speed change devices respectively comprising the shiftable group of gears 24, 25, 26, Fig. 4, and 31, 32, 33 and the shiftable clutch gear 37, operate in a sequence controlled by the devices 142, 142a, 142b, Fig. 15. These devices are serially arranged and each sets up a resistance, and the fluid pressure must be sufficient to overcome the devices while still remaining sufficiently large to operate the last shifter of the series. Various other of the control devices also must be considered in determining the construction and control of the interrupter-reverser 6, and particularly the range of fluid pressure necessary for the proper operation of the device 145, Fig. 15, which controls the delayed application of pressure to the interrupter-reverser 6, and the period of gradual increase of pressure.

What is claimed is:

1. In a transmission and control mechanism the combination of a clutch device including engageable friction members, a fluid operable piston device, a mechanical train connecting said piston device for pressure engagement of said members at a pressure proportioned to the pressure applied to said device, a fluid pressure source, and channel means connecting said source for application of pressure to said device including valve means operable for piston movement in a direction to engage said members, said train including relatively rotatable members operative for said piston device to remain non-rotatable during rotation of the members.

2. In a transmission and control mechanism the combination of a clutch device including engageable friction members, a fluid operable piston device, a mechanical train connecting said piston device for pressure engagement of said members at a pressure proportioned to the pressure applied to said device, a fluid pressure source, and channel means connecting said source for application of pressure to said device including valve means operable for piston movement in a direction to engage said members, said train including relatively rotatable coupling members and an anti-friction bearing interposed therebetween for the transmission of pressure axially of the rotatable coupling member in the direction to engage said friction members.

3. In a transmission and control mechanism the combination of a clutch device including engageable friction members, a fluid operable piston device, a mechanical train connecting said piston device for pressure engagement of said members at a pressure proportional to the pressure applied to said device, a fluid pressure source, channel means connectible between said source and device including a controller valve alternatively adjustable to effect or to interrupt the channel connection, and means operative following the valve adjustment effecting said connection to effect a period of increasing pressure on said device.

4. In a transmission and control mechanism the combination of a clutch device including engageable friction members, a fluid operable piston device, a mechanical train connecting said piston device for pressure engagement of said members at a pressure proportional to the pressure applied to said device, a fluid pressure source, channel means connectible between said source and device including a controller valve alternatively adjustable to effect or to interrupt the channel connection, means for limiting the fluid pressure applied to said piston device for engaging said clutch members, and means operative following the valve adjustment effecting the source and device connection to effect a period of increasing pressure on said device.

5. In a transmission and control mechanism the combination of a clutch device including engageable friction members, a fluid operable piston device, a mechanical train connecting said piston device for pressure engagement of said members at a pressure proportional to the pressure applied to said device, a fluid pressure source, channel means connectible between said source and device including a controller valve alternatively adjustable to effect or to interrupt the channel connection, means operative following the valve adjustment effecting said connection to effect a period of increasing pressure on said device, and means adjustable for changing the duration of said period of increasing pressure.

6. In a transmission and control mechanism the combination of a rate changer including elements shiftable to various position combinations respectively for different rates, driving means for said rate changer including a clutch device comprising engageable friction members, a rate selector adjustable to various positions respectively corresponding to different of said position combinations, means operable in accordance with selector adjustment from one to another of its positions for shifting said shiftable elements to a corresponding position combination, a fluid operable piston device, a mechanical train connecting said piston device for pressure engagement of said clutch members, a pressure fluid source, channel means connectible between said source and piston device, and means controlling said channel connection upon adjustment of said selector to disengage and subsequently to engage said clutch members, said mechanical train comprising motion transmitting connections operative to transmit to said clutch members in the engaging direction thereof a pressure proportional to the fluid pressure applied to said piston device.

7. In a transmission and control mechanism the combination of a rate changer including elements shiftable to various position combinations respectively for different rates, driving means for said rate changer including a clutch device comprising engageable friction members, a rate selector adjustable to various positions respectively corresponding to different of said position combinations, means operable in accordance with selector adjustment from one to another of its positions for shifting said shiftable element to a corresponding position combination, a fluid operable piston device, a mechanical train connecting said piston device for engagement of said clutch members at a mutual pressure proportional to the pressure on said piston device, a pressure fluid source, channel means connectible between said source and piston device, means operative to establish a predetermined pressure on said piston device from said channel means to engage said clutch members, and means operative upon adjustment of said rate selector to temporarily materially reduce said predetermined pressure.

8. In a transmission and control mechanism the combination of a reverser clutch device including a plurality of sets of friction members alternatively engageable for different direction effects, a reversibly fluid operable piston device, a mechanical train connecting said piston device for said alternative engagement of the different sets of friction members and at a pressure proportional to the piston pressure in either engagement, a fluid pressure source, channel means connecting said fluid source for operation of said piston device including reverser valve means for changing the direction of movement thereof, and means limiting the pressure on said piston device from said source to predetermined value in either direction of piston device movement.

9. In a transmission and control mechanism the combination of a reverser clutch device including a plurality of sets of friction members alternatively engageable for different direction effects, a reversibly fluid operable piston device, a mechanical train connecting said piston device for said alternative engagement of the different sets of friction members and at a pressure proportional to the piston pressure in either engagement, a fluid pressure source, channel means connecting said fluid source for operation of said piston device including reverser valve means for changing the direction of movement thereof, means limiting the pressure on said piston device from said source to predetermined value in either direction of piston device movement, and means operative following reverser valve adjustment for engagement of either set of friction members to effect a period of pressure on said piston device materially less than said predetermined pressure.

10. In a transmission and control mechanism the combination of a reverser clutch device including a plurality of sets of friction members alternatively engageable for different direction effects, a reversibly fluid operable piston device, a mechanical train connecting said piston device for said alternative engagement of the different sets of friction members and at a pressure proportional to the piston pressure in either engagement, a fluid pressure source, channel means connecting said fluid source for operation of said piston device including reverser valve means for changing the direction of movement thereof, means limiting the pressure on said piston device from said source to predetermined value in either direction of piston device movement, means operative following reverser valve adjustment for engagement of either set of friction members to effect a period of pressure on said piston device materially less than said predetermined pressure, and means adjustable for changing the duration of said period.

11. In a transmission and control mechanism the combination of a rate changer including elements shiftable to various position combinations respectively for different rates, driving means for said rate changer including a reverser clutch device providing a plurality of sets of friction members alternatively engageable for different direction effect, a rate controller adjustable to various positions respectively corresponding to different of said position combinations, a reversibly fluid operable piston device, a mechanical train connecting said piston device for said alternative engagement of the different sets of friction members and at a pressure proportioned to the piston pressure in either engagement, a pressure fluid source, channel means connectible between said source and piston device for either direction of movement thereof, means limiting the pressure on said piston device from said source in either direction of movement thereof, and means operative upon adjustment of said rate controller to effect a period of pressure on said piston device materially less than said predetermined pressure.

12. In a transmission and control mechanism the combination of a rate changer including elements shiftable to various position combinations respectively for different rates, driving means for said rate changer including a reverser clutch device comprising a plurality of sets of friction members alternatively engageable for different direction effect, a rate controller adjustable to various positions respectively corresponding to different of said position combinations, a reversibly fluid operable piston device, a mechanical train connecting said piston device for said alternative engagement of the different sets of friction members and at a pressure proportioned to the piston pressure in either engagement, a pressure fluid source, channel means connectible between said source and piston device for either direction of movement thereof, means limiting the pressure on said piston device from said source in either direction of movement thereof, means operative upon adjustment of said rate controller to effect a period of pressure on said piston device materially less than said predetermined pressure, and means adjustable for changing the duration of said period.

13. In a transmission and control mechanism the combination of a rate changer including elements shiftable to various position combinations respectively for different rates, driving means for said rate changer including a reverser clutch device comprising a plurality of sets of friction members alternatively engageable for different direction effect, a rate controller adjustable to various positions respectively corresponding to different of said position combinations, a reversibly fluid operable piston device, a mechanical train connecting said piston device for said alternative engagement of the different sets of friction members and at a pressure proportioned to the piston pressure in either engagement, a pressure fluid source, channel means connectible between said source and piston device for either direction of movement thereof, and means operative upon adjustment of said rate controller to first effect a period of pressure on said piston device materially less than said predetermined pressure and subsequently to effect said predetermined pressure.

GLENN C. HOLMES.